United States Patent
Barr

[15] 3,667,139
[45] June 6, 1972

[54] METHOD OF WRITING FOR COMMUNICATING WITH THE VISUALLY HANDICAPPED AND PAPER THEREFOR

[72] Inventor: Ruth L. Barr, 53 Webster Acres, Webster Groves, Mo. 63119

[22] Filed: Sept. 14, 1970

[21] Appl. No.: 71,830

[52] U.S. Cl. ..................................................35/38
[51] Int. Cl. ...........................................G09b 21/00
[58] Field of Search ..................35/36, 37, 38, 26, 31 A; 264/322; 283/45

[56] References Cited

UNITED STATES PATENTS 2,616,198  11/1952  Sewell......................35/38 X
3,486,246  12/1969  Johnson....................35/36 UX

FOREIGN PATENTS OR APPLICATIONS 1,090,059  11/1967  Great Britain

*Primary Examiner*—Wm. H. Grieb
*Attorney*—Polster and Polster

[57] ABSTRACT

Marking a polyethylene paper overlaying a hard surface with an ordinary extra size ball point pen or dull pencil embosses characters on the upper side of the paper. These raised characters may be read tactually by the visually handicapped, including the blind. The characters can also be read visually. The embossing effect is enhanced by rubbing a finger over the area marked. A paper embossed with equally spaced parallel lines facilitates the method.

16 Claims, 3 Drawing Figures

INVENTOR
RUTH L. BARR
By Polster and Polster
ATTORNEYS

METHOD OF WRITING FOR COMMUNICATING WITH THE VISUALLY HANDICAPPED AND PAPER THEREFOR

BACKGROUND OF THE INVENTION

This invention relates to a method and paper for enabling relatively simple written communication with the visually handicapped.

Difficulties in communicating in writing with visually handicapped persons have long been recognized. The traditional method of communication, Braille, requires learning a special code, learning to write backwards, and obtaining special equipment. It also produces a copy which is not legible to most sighted persons. Methods and equipment have been developed which overcome some of these drawbacks, but none has overcome all of them.

It is an object of this invention to provide a method and a paper which enable communication with the visually handicapped in ordinary letters or numbers which are readable both tactually and visually.

It is another object of this invention to provide such a method and paper which may be used immediately by the newly blinded, including multiply handicapped persons such as those who are also deaf.

It is another object to provide such a method which permits ordinary left-to-right writing, and which requires no special equipment other than the paper.

It is another object of this invention to provide such a paper which is inexpensive and easy to use for both the writer and reader.

Other objects will become apparent to those skilled in the art in the light of the following description and accompanying drawings.

SUMMARY OF THE INVENTION

In accordance with this invention, generally stated, a method of writing for communication with the visually handicapped is provided in which a sheet of plastic paper is placed directly onto a hard surface and is written upon with a stylus (i.e., any writing instrument) which deforms and raises the paper along the line of pressure of the writing instrument. The paper is made of a plastic material which is substantially and permanently pressure deformable with manually exerted stylus pressure to stretch and raise the paper along a line of pressure of the stylus. An opaque, filled, modified polyethylene sheet having a thickness of from about 1½ mils to about 6 mils is preferred, and provides good ink adhesion as well as an attractive appearance and feel. Such a modified polyethylene sheet may be made by blending with high density polyethylene (100 parts by weight) an ethylene/vinyl copolymer accommodation resin (5 – 50 parts by weight) and a filler (5 – 75 parts by weight) and extruding the material into a sheet.

In the preferred embodiment of method of this invention the writing is done with an ordinary jumbo ball-point pen or a blunt pencil, and the writing is rubbed with a finger to enhance its legibility.

The paper of the invention is ruled with equally spaced embossed parallel lines which greatly facilitate reading. The embossed lines may be raised from the adjacent surface a distance of from about 2 mils to about 20 mils, and may be spaced apart any convenient distance, generally from about three-eighths inch to 1 inch.

In the preferred embodiment of paper, the lines are raised about 5 mils and are spaced approximately three-fourths inch apart over substantially the entire face of the paper.

DESCRIPTION OF THE PREFERRED EMBODIMENT

Figure 1:
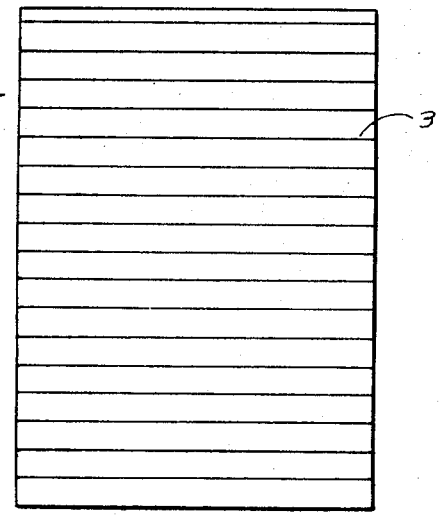
FIG. 1 is a top plan view of a sheet of paper of this invention, for use in performing the method of the invention.

Referring now to the drawings, reference numeral 1 indicates one illustrative embodiment of a sheet of paper of this invention, for use in practicing the method of the invention. The paper is made of a tough flexible plastic material which is permanently pressure deformable, in a suitable range of thicknesses, with moderate stylus pressure. More particularly, the material has an elastic limit which is sufficiently low that laterally moving downward stylus pressure concentrated in a small area will exceed the elastic limit, and has a tensile strength sufficiently high that such pressure will not tear the paper. Additionally, the material has considerable elasticity so that permanently deformed characters are raised a substantial height above the surface of the paper by the method of the invention, as is discussed more fully hereinafter. The paper is preferably markable in a contrasting color with pencil or ball-point pen.

A particularly suitable paper is an opaque, filled polyethylene sheet. Illustratively, the compositions of suitable polyethylene sheet materials and a method for making them are described in British Patent No. 1,090,059 to Union Carbide Corporation (corresponding to Netherlands Appl. 6414881 and French Patent 1,425,566) and in French Patent of Addition 90,040 (to 1,425,566). These materials are made of high density polyethylene (density 0.96, melt index 0.05 – 2.0 dg./min.) blended with an ethylene/vinyl copolymer accommodation resin (melt index 0.2 – 100 dg./min.) (5 – 50 parts copolymer, by weight, per 100 parts polyethylene) and a filler (5 – 75 parts filler, by weight, per 100 parts polyethylene). The materials may be extruded into sheets by well known methods, such as the method of U.S. Pat. No. 2,632,206. The materials may be modified to enhance certain of their properties, such as by adding ethylene oxide polymers (U.S. Pat. No. 3,425,981) to enhance anti-static and printability properties, by adding branched polyethylene wax (U.S. Pat. No. 3,299,177) to make the sheets crack resistant, heat treating the sheets (French Patent 1,550,770) to smooth the sheets, or heat treating the materials (U.S. Pat. No. 3,412,080) to improve their extrudability.

The composition of a particularly suitable sheet is set out below:

| | |
|---|---|
| High density polyethylene (melt index 0.1 dg./min., density 0.960) | 58% |
| Ethylene/vinyl acetate copolymer (18% vinyl acetate, density 0.942, melt index 0.2 dg./min.) | 10% |
| Diatomaceous earth (particle size $4\mu$) | 20% |
| $TiO_2$ (particle size $0.2\ \mu$) | 10% |
| Ethylene oxide homopolymer (mol. wt. greater than 100,000) | 2% |

The extruded film has an elastic modulus of about 10,000 kg./cm.$^2$ (140,000 lbs./in.$^2$) and an elongation in the machine and transverse directions of about 300 and 100 percent respectively in a 4 mil sheet.

Commercially available polyethylene sheet materials usable in the method of this invention and as a blank for the paper of the invention are sold by Union Carbide Corporation under the trademark "UCAR" and by Mead Papers Division of The Mead Corporation under the trademark "AcroArt." The paper is preferably about 3 mils thick, although paper in the range of about half as thick to about twice as thick is also usable.

The sheet 1 of the invention is formed from a suitable plastic sheet by embossing it with regularly spaced rulings 3 extending across the short dimension of the sheet. The rulings 3 are raised approximately five mils above the upper surface of the sheet 1. The rulings 3 are spaced apart approximately three-fourths inch.

The rulings 3 of the paper of this invention provide an easy reference for the writer and enable the writer to form letters which are both linearly aligned and uniform in height. They enable the reader to follow individual lines of writing tactually, and to move from one line to the next far more easily than if the lines were omitted.

Figure 2:
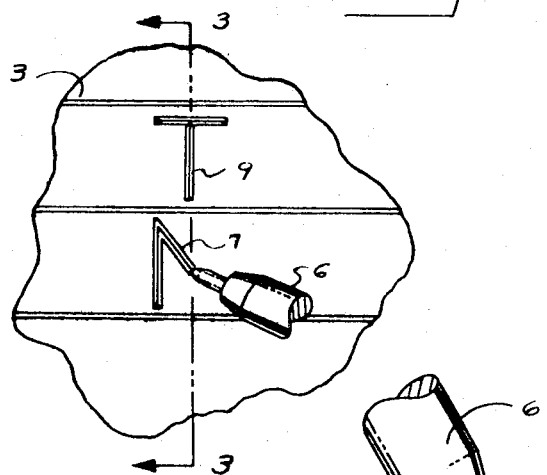
FIG. 2 is a detail of the sheet of paper shown in FIG. 1, being used in performing the method of the invention.
Figure 3:
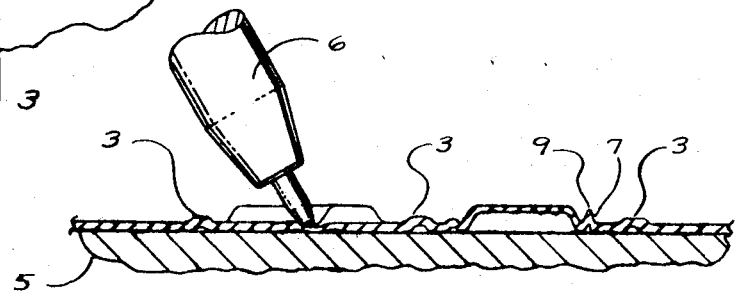
FIG. 3 is a sectional view, taken along the line 3—3 of FIG. 2.

The paper of this invention is used in practicing the method of this invention as follows. A single sheet of the paper is placed directly onto a hard surface, such as the surface 5. The surface may be any hard, smooth surface such as glass, metal, or hard plastic. The paper is then written upon with a suitable stylus. It has been found that a stylus having a rounded tip produces the most satisfactory results. Such instruments include an ordinary, somewhat dull, lead pencil or an ordinary ball-point pen, preferably an oversize pen 6. The paper is written upon in the usual way except that the impressions must be made with added pressure to ensure an embossing effect. Photomicrographs of the writing process indicate that as the stylus moves it pulls and stretches the paper along a line 7 which is sufficiently wide to provide a sharp raised ridge 9 as the pressure is removed, as shown in FIGS. 2 and 3. It has been found that the uniformity and overall height of the embossed marking is greatly enhanced by rubbing a finger over the marking, preferably while the paper is still on the hard surface and preferably across the marking.

Mastering the technique of pressing down on the polyethylene paper takes only a few practice trials. The best type of letter or number is a simply made one, without extra loops or frills. The embossed characters have a mean height above the page surface of approximately 16 mils, although this height varies somewhat with varying pressures and varying writing techniques. Although the height of the characters is somewhat less than the usual height of Braille symbols, this characteristic has been found experimentally to cause little difficulty. In fact a small number of diabetic patients, who were sighted in youth, learned Braille after the onset of blindness, and had lost much tactile sensitivity (and hence were having difficulty with Braille), were able to read with relative ease Arabic numbers and letters produced by the present method.

Documents written by the present method on the paper of the invention are legible either visually or tactually. They are read tactually with the fingertips. The parallel rulings provide easy references in determining the positions of individual letters and words and also provide an easy means for finding the next line of writing without danger of skipping a line or repeating a line.

It has been found that the characters produced by the method of this invention are almost universally legible. Furthermore, the visually perceptible mark made by a ball-point pen or pencil is an aid to the partially sighted.

Numerous variations in the method and paper of this invention, within the scope of the appended claims, will occur to those skilled in the art in the light of the foregoing description. For example, although pointed styli are presently preferred, styli which produce entire characters, lines of characters or pages of characters in a single stroke may also be used. Although the plastic papers described are presently preferred, others may be used. The parallel lines may be formed by means other than embossing. These variations are merely illustrative.

Having thus described the invention, what is claimed and desired to be secured by Letters Patent is:

1. A method of writing for communicating with the visually handicapped comprising placing a sheet of filled high density polyethylene paper directly onto a hard surface, said polyethylene paper being substantially and permanently pressure deformable with stylus pressure to stretch and raise said paper along a line of pressure of said stylus, and marking said polyethylene paper with a stylus with sufficient pressure to raise characters on the upper surface of said paper.

2. The method of claim 3 including a further step of rubbing said characters to enhance the raising of said paper along said line of pressure.

3. The method of claim 1 wherein the stylus is pointed.

4. The method of claim 3 wherein the stylus produces on the paper a line of a color contrasting with the color of the paper.

5. The method of claim 3 wherein the paper is made of a modified polyethylene material comprising 100 parts by weight of a high density polyethylene, 5 – 50 parts by weight of an ethylene/vinyl copolymer accommodation resin, and 5 – 75 parts by weight of a filler.

6. The method of claim 5 wherein the paper is between about 1½ and about 6 mils thick.

7. The method of claim 6 wherein the paper is about 3 mils thick.

8. The method of claim 3 wherein the sheet of paper is provided with parallel lines through substantially the entire length of said sheet, for providing guides for writing on said paper.

9. A sheet of paper for written communication with the visually handicapped comprising a sheet of filled high density polyethylene paper, said sheet being substantially and permanently pressure deformable with manually exerted stylus pressure to stretch and raise said paper along a line of pressure of said stylus to produce tactually discernible characters, and tactually discernible means on said sheet for defining lines of written characters to be written on said sheet, said tactually discernible means comprising a plurality of raised parallel lines extending substantially from one side edge of said sheet to the other side edge of said sheet through substantially the entire length of said sheet.

10. The sheet of paper of claim 9 wherein the paper is a modified polyethylene material comprising 100 parts by weight of a high density polyethylene, 5 – 50 parts by weight of an ethylene/vinyl copolymer accommodation resin, and 5 – 75 parts by weight of a filler.

11. The sheet of paper of claim 10 wherein the sheet is from about 1½ to about 6 mils thick.

12. The sheet of paper of claim 9 wherein a four mil sheet of the plastic material has a modulus of elasticity on the order of 10,000 kilograms per square centimeter.

13. The sheet of paper of claim 9 wherein the lines are uniformly spaced apart about three-eighths of an inch to about 1 inch.

14. The sheet of paper of claim 9 wherein the raised parallel lines are embossed in said paper and are raised a height of from about 2 mils to about 20 mils.

15. The sheet of paper of claim 10 wherein the paper is about three mils thick, the lines are spaced uniformly about three-quarters of an inch apart and the lines are raised about 5 mils.

16. A sheet of paper including a plurality of rows of raised characters, said characters being tactually readable by the visually handicapped, and tactually discernible means on said sheet for identifying said rows of characters, said tactually discernible means comprising a plurality of raised parallel lines, at least one of said lines extending substantially from one side edge of said sheet to the other side edge of said sheet between each of said rows of characters.

* * * * *